Sept. 13, 1949.  W. F. DEHN  2,481,648
APPARATUS FOR COMBINING VARIABLE QUANTITIES
Filed Sept. 15, 1943  4 Sheets-Sheet 1
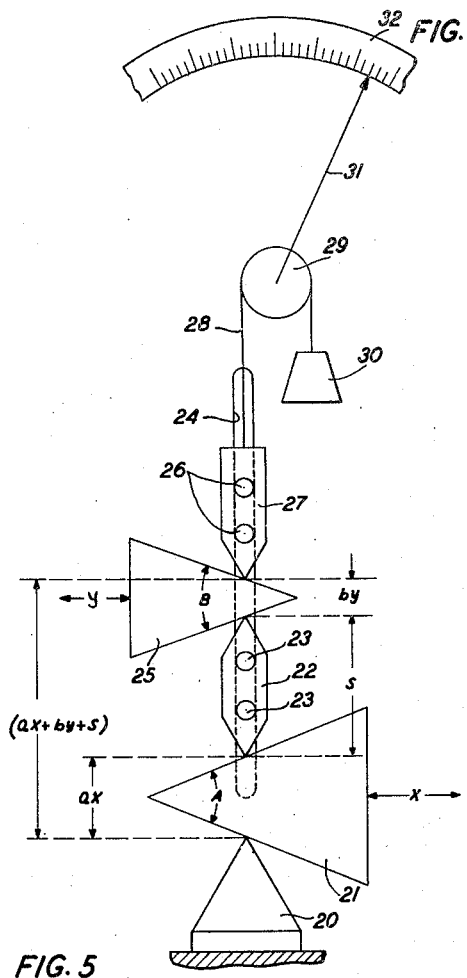
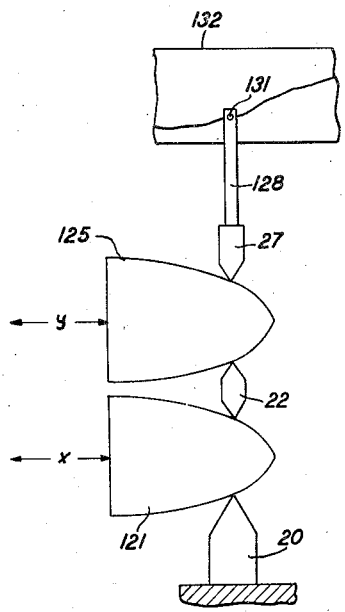
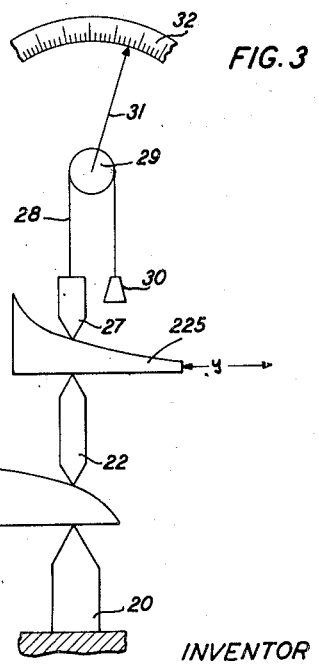
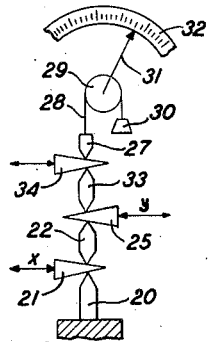
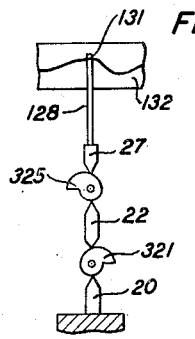
INVENTOR
W. F. DEHN
BY
E. R. Nowlan
ATTORNEY Sept. 13, 1949.  W. F. DEHN  2,481,648
APPARATUS FOR COMBINING VARIABLE QUANTITIES
Filed Sept. 15, 1943  4 Sheets-Sheet 2
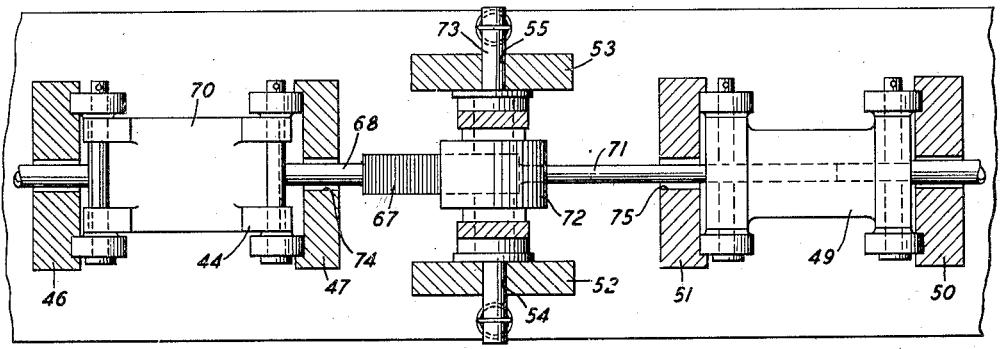
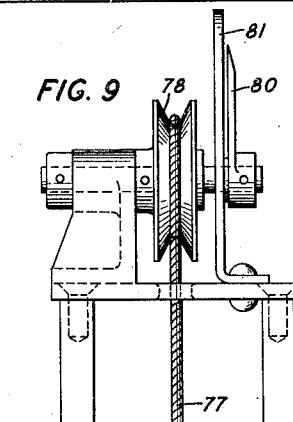
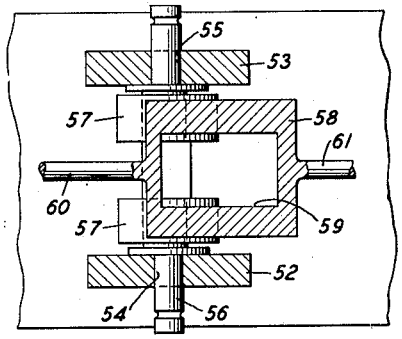
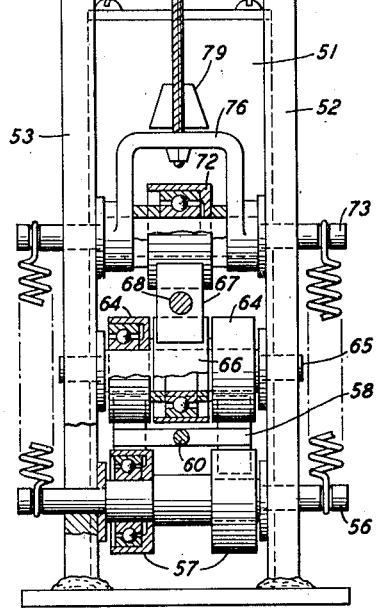
INVENTOR
W. F. DEHN
BY
E. R. Nowlan
ATTORNEY Sept. 13, 1949.  W. F. DEHN  2,481,648
APPARATUS FOR COMBINING VARIABLE QUANTITIES
Filed Sept. 15, 1943  4 Sheets-Sheet 3

INVENTOR
W. F. DEHN
BY
E. R. Dowlan
ATTORNEY

Sept. 13, 1949.  W. F. DEHN  2,481,648
APPARATUS FOR COMBINING VARIABLE QUANTITIES
Filed Sept. 15, 1943  4 Sheets-Sheet 4
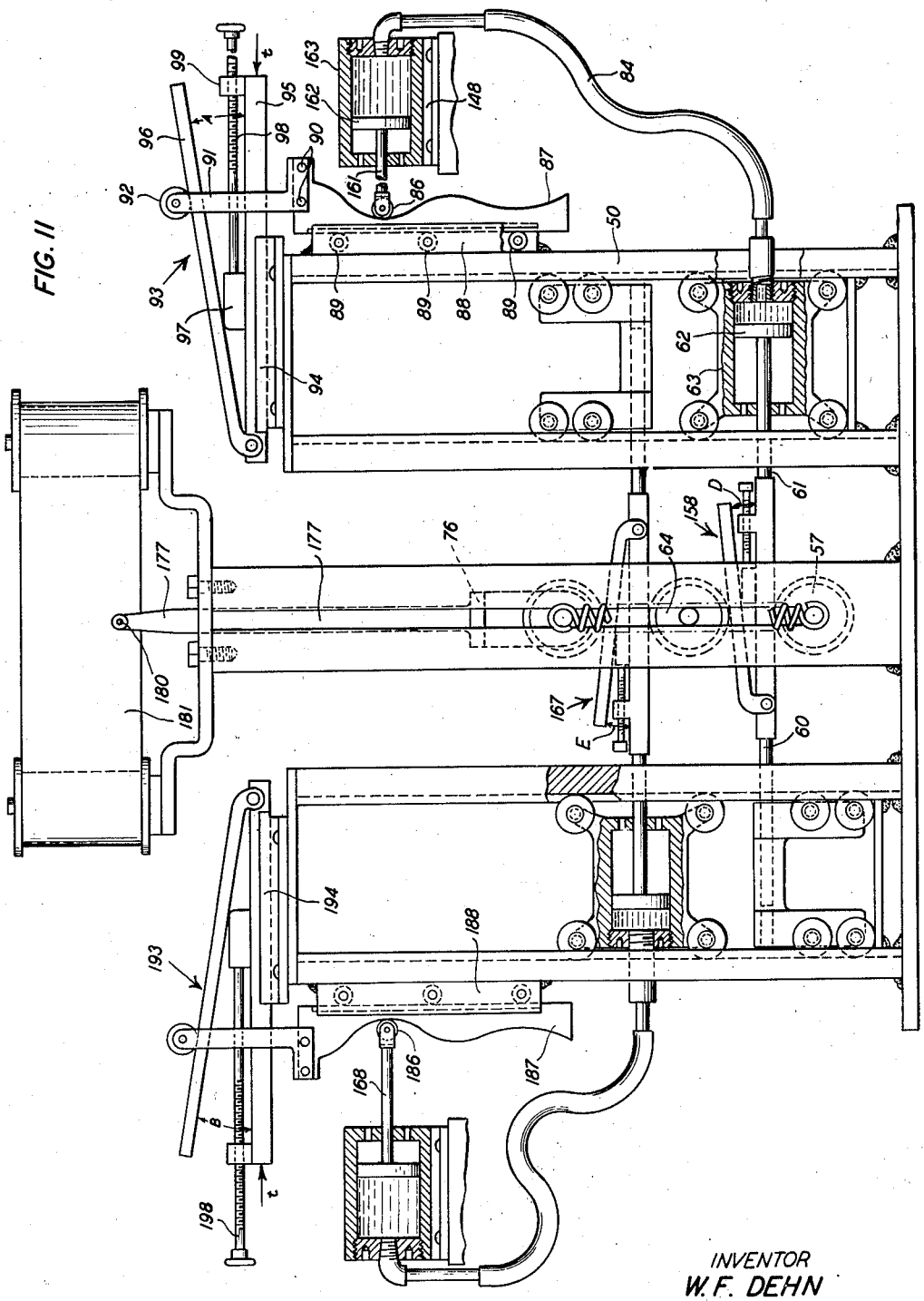
INVENTOR
W. F. DEHN
BY
E. R. Nowlan
ATTORNEY Patented Sept. 13, 1949

2,481,648

UNITED STATES PATENT OFFICE 2,481,648

APPARATUS FOR COMBINING VARIABLE QUANTITIES

William F. Dehn, Nutley, N. J., assignor to Western Electric Company, Incorporated, New York, N. Y., a corporation of New York Application September 15, 1943, Serial No. 502,546

4 Claims. (Cl. 235—61)

This invention relates to apparatus for combining variable quantities and more particularly to apparatus for indicating or recording or both indicating and recording the combined value of two or more continuously varying quantities or functions of such quantities, the combination being by addition, subtraction, multiplication or division.

There are innumerable instances in many arts where it is desired to indicate, e. g. by a pointer moving over a scale, or to record, e. g. by a tracing point moving transversely to and fro on a longitudinally moving tape, the sum, difference, product or quotient of two or more varying quantities. For example, the total effective heat input to a closed oven chamber may be controlled by the indicated or recorded sum of temperatures taken simultaneously at a plurality of points within the chamber. Again, electric power is indicated by the product of voltage and amperage of a current.

An object of the present invention is to provide apparatus to accept two or more straight line motions representing respectively two or more continuously varying quantities, to combine these motions into a single motion representing the sum, difference, product or quotient of the quantities, and to indicate the instantaneous combined quantity, or to record continuously the combined quantity, or both.

A further object of the invention is to provide apparatus capable of indicating or recording the sum of a plurality of mathematical functions of a single variable whose values are known either tabularly or graphically, and can be graphically represented.

With the above and other objects in view a simpler form of the invention may be embodied in an apparatus comprising a cam member drivable to a displacement proportional to one variable to be combined, a movable abutment to be displaced correspondingly by the cam member, a second cam member shiftable with the abutment and drivable transversely to the motion thereof to a displacement proportional to a second variable to be combined, a second movable abutment to be displaced correspondingly by the second cam, and means actuable by the second abutment to indicate the motion thereof on a scale or to record the same on a moving record surface.

Other objects and features of the invention will appear from the following detailed description of embodiments thereof taken in connection with the accompanying drawings in which the same reference numerals are applied to identical parts in the several figures and in which Fig. 1 is a diagrammatic view of one form of embodiment to illustrate the principle of the invention;

Fig. 2 is a similar view of a modified form;

Fig. 3 is a similar view of another modification;

Fig. 4 is a similar view of a third modification;

Fig. 5 is a similar view of a fourth modification;

Fig. 6 is a similar view of a fifth modification;

Fig. 8 is a horizontal section on the line 8—8 of Fig. 7;

Fig. 9 is a vertical section on the line 9—9 of Fig. 7;

Fig. 10 is a detail section on the line 10—10 of Fig. 7, and

Fig. 11 is a view similar to Fig. 7 of a modified form.

Figure 7:
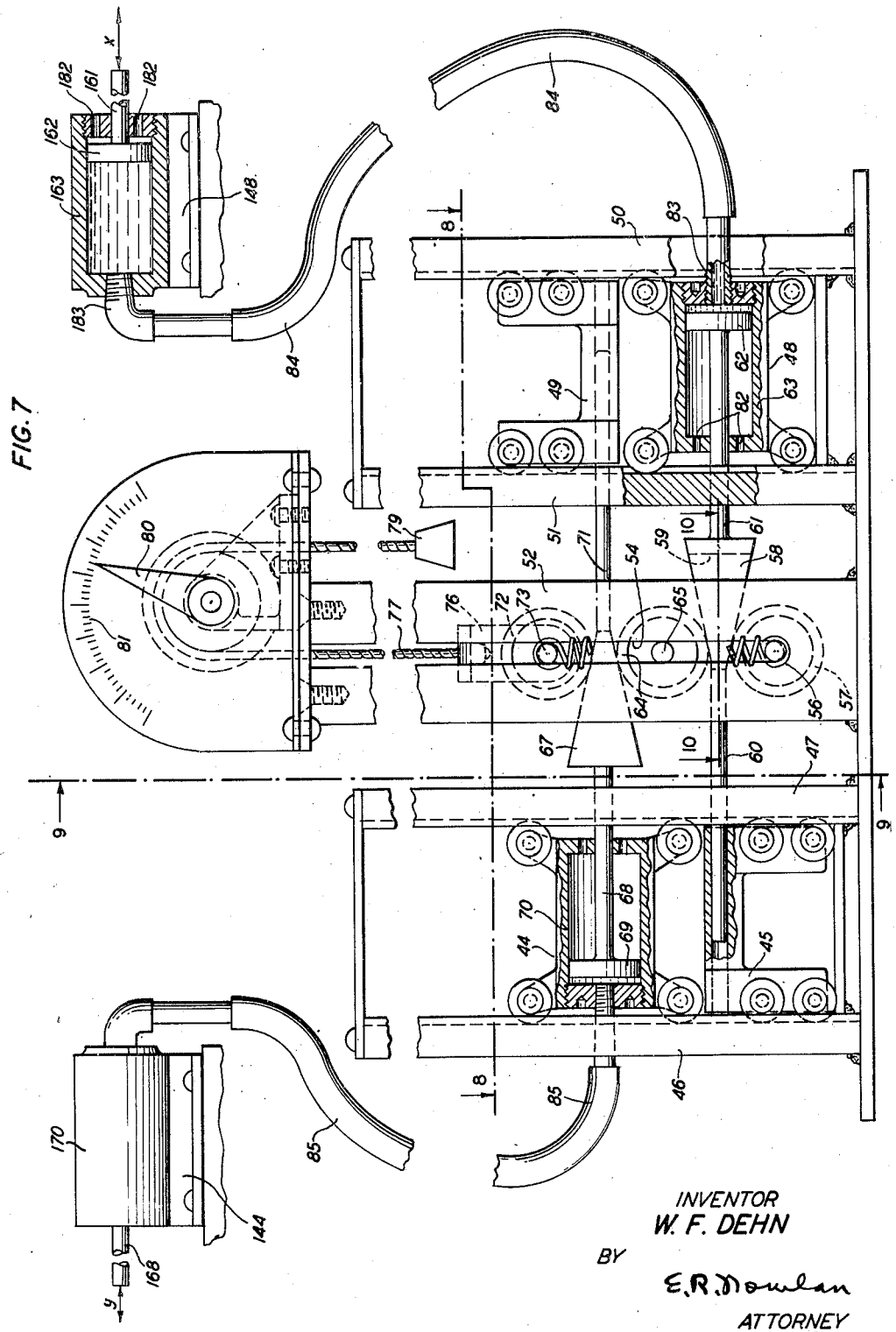
Fig. 7 is a view in front elevation partly in section and with parts broken away of a complete embodiment of the invention.

The first six figures of the drawings are presented to enable an easy visualization of the range of applications of the invention. Thus, in Fig. 1 there is a fixed abutment 20 upon which is supported a vertically freely shiftable and horizontally drivable cam wedge 21. Upon this cam rests a movable abutment slide 22 confined to free vertical motion only, e. g. by pins 23 sliding in a guide slot 24. On the slide 22 rests a second vertically freely movable and horizontally drivable wedge cam 25; and upon the cam 25 rests a second vertically movable slide 27 guided by pins 26 in the slot 24. A cord 28 fastened to the slide 27 runs over a sheave 29 to a weight 30. A pointer 31 is moved by the sheave over a scale 32.

Assume now that the wedge 21 is driven to the left and retracted to the right according as some varying value $x$ increases and decreases. The slide 22 will then be raised and lowered in strict proportion to the changing value of $x$ and will carry the wedge 25 and the slide 27 vertically up and down with itself. Let the wedge cam 25 be driven to the right and retracted to the left in accordance with the varying value of some other variable $y$ in similar fashion. Then the wedge 25 lifts and lowers the slide 27 from and toward the slide 22 in strict proportion to the changing value of $y$. Since the slide 22 is already following the varying value of $x$, the motion of the slide 27 will follow the changing value of the sum of $x$ and $y$. The distance from the top of the abutment 20 to the bottom of the slide 27 is always $ax+by+s$, where $s$ is the length of the slide 22, $a$ is a constant ratio proportional to 2 tan ½A (A being the apex angle of the wedge 21) by which the horizontal motion $x$ of the wedge 21 is converted into vertical motion of the slide 22, and $b$ is a similar ratio for $y$. By suitable choice of A and B (making A equal to B in the simplest case where $x$ and $y$ represent quantities of like kind, measured in the same units) and by suitably calibrating the scale 32, the pointer 31 will indicate the instantaneous algebraic sum of $x$ and $y$ at all times and will follow the variations of $(x+y)$ regardless of how $x$ and $y$ individually vary. By substituting for the cord, pointer and scale of Fig. 1, a rod 128 carrying a marking point 131 which runs to and fro with the motion of the slide 27 transversely across a paper tape 132 or other suitable surface traveling with constant motion transverse to the motion of the point 131, as illustrated in Fig. 2, there will be traced on the tape 132 a rectangular coordinate graph of the sum $(x+y)$ of the quantities $x$ and $y$ plotted against time. Although the wedge cams 21 and 25 are shown as oppositely directed in Fig. 1, this is not a necessary relation. They may equally well be like directed, as are the wedge cams 121 and 125 of Fig. 2.

If the operating cams be formed, as in Fig. 2, with their cam surfaces shaped to follow the rectangular coordinate curve of the logarithmic function, then the pointer 31 will indicate on a suitably calibrated scale 32 the instantaneous value of the product of $x$ and $y$ since the motion of the slide 27 will follow the sum of log $x$ and log $y$, i. e. log $xy$; or the point 131 will trace the graph of log $xy$. Similarly, if the wedge cam 221 be shaped to the curve of the logarithm while the cam 225 is shaped to the curve of log 1/$y$, as in Fig. 3, the indication or curve, as the case may be, will be of the value of the logarithm of the quotient $x/y$.

In each of Figs. 1, 2 and 3, the operating cams 21, 25, 121, 125 and 225 are shown as rectilinearly reciprocable wedges. They may, however, equally well be rotary cams 321 and 325 as in Fig. 4, which is equivalent to Fig. 1 in operation. In each of Figs. 1 and 2, the cams are shown as symmetrical about a horizontal axis. This is preferable in some instances; but in others it may be preferred to have a cam face on one side only as in Fig. 3. In each of Figs. 1, 2, 3 and 4 there are two operative cams and the indication or record is of the value of the sum, difference, product or quotient of two varying quantities $x$ and $y$. There may, however, within limits, be any number of operative cams. Fig. 5 shows an arrangement similar to Fig. 1, but having an additional slide 33 and cam 34 interposed between the cam 25 and slide 27, the aparatus then indicating the algebraic sum of $x$, $y$ and $z$.

Fig. 6 illustrates the principles of a considerably developed form of the invention. Here the simple wedge 21 of Fig. 1 is replaced by a device generally indicated at 421 having a horizontally reciprocable cam base 35 on which is pivoted a cam member 36 so that the two together constitute a wedge cam on which the slide 22 rests. Slidably adjustable along the base 35 is a block 37 to alter the angle of the cam proper 36, and adjustable by means of a screw 38 running through a nut 39 on the base 35. The wedge cam 25 of Fig. 1 is replaced by a similar assembly generally indicated at 425 and having corresponding elements 135, 136, 137, 138 and 139 respectively. The outer ends of the base members 35 and 135 abut respectively against and are reciprocated by vertically reciprocable cam members 40 and 140 respectively and compression springs 41 and 141. The cams 40 and 140 are driven in turn by adjustable cam wedges 42 and 142 similar in structure to the devices 421 and 425.

Let the cam bases 235 and 335 be driven leftwardly and rightwardly respectively at the same constant speed $t$. The cams 40 and 140 are then driven upwardly at rates $at$ and $bt$ respectively, where $a$ and $b$ are constant coefficients dependent respectively upon tan A and tan B where A and B are the angles of slope of the members 236 and 336 with respect to the bases 235 and 335 respectively. The movement of 40 then is $at$ and that of 140 is $bt$. Let the cam faces of the cams 40 and 140 be shaped to $f(u)$ and $F(u)$ respectively where $f$ and $F$ are any two desired functions of a real variable which are single valued and continuous within the range of values of interest. The displacements of 421 and 425 by the cams 40 and 140 then become $f(at)$ and $F(bt)$ respectively. Taking the angles of slope of the cam bars 36 and 136 with respect to their bases as D and E respectively, the cam 421 drives the slide 22 up at a rate $df(at)$ and the cam 425 drives the slide 27 at a rate $eF(bt)$, where $d$ and $e$ are constants dependent upon tan D and tan E respectively. Thus, finally, the motion of the tracer point 131 is $df(at)$ plus $eF(bt)$, and if the tape 132 moves at appropriate constant speed to the left, the point 131 will trace thereon the curve of the equation $$y=df(ax)+eF(bx)$$

where $a$ and $b$ may be adjusted to desired predetermined values by manipulation of the screws 238 and 338, $d$ and $e$ may be similarly set by the screws 38 and 138 respectively, and the functions $f$ and $F$ may be any desired, provided cams 40 and 140 can be cut to their curves. As before, although only two cams 421 and 425 in the vertical series are shown, the apparatus is not necessarily so limited, but may be extended to deal with any number of terms within reasonable limits. Thus the apparatus may be expanded to give instantaneous values or to construct the graph for a very wide range of expressions of the general type $$y=k_1f_1(a_1x)+k_2f_2(a_2x)+k_3f_3(a_3x)+\ldots$$

Thus if the cams 40, 140, etc. be cut to identical sine curves, all alike, by suitable adjustment of the cam bars, the apparatus may be set to sum a Fourier series $$y=k_1\sin(a_1x)+k_2\sin(a_2x)+\ldots$$

to as many terms as there are cams 40, 140, etc. If the two cams of Fig. 6 are cut to the curves of the Bessel functions e. g. those of zero order, $J_0(x)$ and $Y_0(x)$, the apparatus may be used to express mechanically the solution of the differential equation $$\frac{d^2y}{dx^2}+\frac{1}{x}\frac{dy}{dx}+k^2y=0$$

whose general solution is $$y=C_1J_0(kx)+C_2Y_0(kx)$$

Figs. 1 to 6 inclusive and the above discussion of them are believed to explain clearly the general principles and something of the scope and general purport of the invention. Figs. 7 to 11 inclusive show two mechanically developed and operative embodiments in full detail. In Fig. 7 a pair of carriages 44 and 45, one above the other, run independently of each other and freely between vertical guide rails 46 and 47 at the left of the apparatus. At the right, similar carriages 48 and 49 run similarly between vertical guide rails 50 and 51. Between the two sets of guide rails is a pair of vertical standards 52 and 53, one behind the other, and formed with vertical parallel guide slots 54 and 55. In the bottom of these slots rests a shaft 56 having a pair of rollers 57, 57 spaced apart and journalled thereon on antifriction bearings. On the rollers 57, 57 rests a cam wedge 58 having its center cut out as shown at 59 in Figs. 7 and 10. The left end of this cam has a guide and support rod 60 integral therewith or rigidly secured thereto, extending horizontally into and slidable in a corresponding bore in the carriage 45. At the right end of the cam 58 is a similar rod 61 which is also the piston rod of a piston 62 in a cylinder 63 secured to the carriage 48.

On the wedge 58 rests a pair of rollers 64, 64, spaced apart and journalled on ball bearings on a shaft 65 whose ends are vertically freely slidable in the slots 54 and 55. Between the rollers 64, 64 is journalled similarly a third roller 66; and on the roller 66 rests the upper wedge cam 67 having on its left end a piston rod 68 secured to a piston 69 in a cylinder 70 on the carriage 44. The wedge cam 67 also has on its right end a guide rod 71 running in a corresponding bore in the carriage 49. On the wedge 67 rests a roller 72 journalled on ball bearings on a shaft 73 also vertically freely slidable in the slots 54 and 55. The guide rails 47 and 51 are slotted vertically at 74 and 75 respectively (Fig. 9) to allow the rods 60 and 68, and 61 and 71, to move freely up and down.

A stirrup 76 mounted on the shaft 73 has a cord 77 secured thereto running up and over a sheave 78 and down to a weight 79. On the pivot shaft of the sheave 78 is secured a pointer 80 running over a scale 81.

The cylinder 63 on the carriage 48 has its left end wall perforated with one or more apertures 82 to allow air to enter or escape freely therethrough. The right end wall is solidly closed except for a threaded bore to receive a nipple 83 secured liquid tight therein. At some point conveniently near a stationary support 148 carries a cylinder 163 having a piston 162, a piston rod 161, air apertures 182 and a nipple 183. The nipple 83 is connected to the nipple 183 by a flexible, inelastic, inextensible hose 84. Similarly a cylinder 170 mounted on a conveniently located stationary support 144 is connected by a hose 85 to the cylinder 70 and has a piston rod 168.

Assume now that the bores of the cylinders 63 and 163 are the same and that the system from the left side of the piston 162 to the right side of the piston 62 is filled completely with a suitable pressure transmitting liquid, e. g. water or oil. Assume the same for the cylinders 70 and 170. Then any displacement $x$ of the piston rod 161 will effect a displacement of the piston rod 61 and hence of the cam 58 identical in direction and magnitude, the piston 62 being driven to the left by hydraulic pressure from the cylinder 163 and to the right by atmospheric pressure through the aperture 82. If the cam 58 be thus displaced to the left, it will move both leftwardly and upwardly over the twin cam rollers 57 whose shaft 56 rests in the bottom of the slots 54 and 55 and so cannot move downwardly. In moving upwardly thus, the cam 58 lifts the rods 60 and 61 and thus lifts the carriages 45 and 48 which run freely in their guide rails but cannot turn therein. Hence the rigid bar consisting of the rod 60, the cam 58, and the rod 61 moves freely up and down, as required by the cam 58 riding over the rollers 57, but cannot tilt and remains always parallel to itself. The cam 58 is so proportioned that in all normal operation it does not come in contact with the central overlying cam roller 66 because of the opening 59 (Fig. 10) in the cam. The cam 58 does, however, underrun and lift the twin rollers 64 and therewith the shaft 65 and roller 66 on which the cam wedge 67 rests. The structures associated with the cam 67 are parallel in function and arrangement to those described in connection with the cam 58. Hence lifting the cam 67 causes the carriages 44 and 49 to rise as the rigid bar 68, 67, 71 is thus lifted, this bar remaining always parallel to itself. And this lifting of the cam 67 also raises the roller 72 and therewith the stirrup 76 so that the cord 77 and weight 79 actuate the sheave 78 to move the pointer 80 over the scale 81 a distance proportionate to $x$. The piston 163 being simultaneously given a displacement $y$, causes the wedge 67 to move horizontally a distance $y$ and so to ride over the roller 67 and raise the roller 72 and stirrup 76 an additional amount to that already effected or being effected by the cam 58, to cause the pointer 80 to move additionally over the scale 81 a distance proportionate to the distance $y$. Hence, by proper calibration of the scale 81, the pointer 80 indicates on the scale at any moment, the instantaneous value of the algebraic sum of $x$ and $y$. The arrangement shown in Figs. 7, 9, 10 and 11 is thus a complete and operative practical embodiment of the system shown diagrammatically in Fig. 1. It is not believed necessary to discuss in detail the modifications required to convert this into similar embodiments of the systems diagrammed in Figs. 2, 3, 4 and 5, as these details are thought to be merely matters of mechanical design. Fig. 11 illustrates, however, the modification of the top center portion of Fig. 7 to provide means for recording graphically continuous combined values as in Figs. 2, 4 and 6 instead of indicating instantaneous combined values as in Figs. 1, 3, 5 and 7.

Fig. 11 bears generally the same relation to Fig. 7 that Fig. 6 does to Fig. 1. The outer end of the piston rod 161 carries a cam roller 86 which runs against a cam 87 which in turn may conveniently run in a guide base 88 mounted on the rail 50 and having ball bearing rollers 89 for the straight inner edge of the cam 87 to run on. The cam 87 is preferably a stiffly rigid and hard lamina of suitable material, e. g. metal, plastic, wood or the like, which is interchangeably secured, as by bolts 90, to a vertically extending bifurcate driving member 91 in which is mounted a cam roller 92. The roller 92 runs on an adjustable wedge cam generally indicated at 93, reciprocable horizontally in a base 94 which may conveniently be mounted on the top of the guide rails 50 and 51. The cam 93 comprises a base bar 95 slidable in the base 94 with a pitch bar 96 pivoted thereto at the left end and on which the roller 92 runs. The angle A between these bars is adjustable by means of the block 97 movable between the bars by the screw 98 passing through the nut 99 fixed on the bar 95. There is a duplicate structure and arrangement on the left side of the apparatus where a wedge cam generally indicated at 193, adjustable as to its angle B by a screw 198, acts to drive an interchangeable cam 187 which drives the piston rod 168 through a roller 186 mounted therein. The cams 58 and 67 of Fig. 7 are replaced by the adjustable wedge cams 158 and 167. The cord 77, sheave 78, weight 79, pointer 80 and scale 81 of Fig. 7 are omitted. A vertical rod 177 is mounted on the stirrup 76 instead of the cord and extends upwardly. A tracing point 180 is mounted on the rod 177 to run vertically across a paper tape 181 driven horizontally at constant speed by any suitable means not shown.

The cams 87 and 187 are formed to the curves of any desired continuous single valued functions $f(u)$ and $F(u)$, respectively. Then if the wedge cam 93 be driven leftwardly at constant speed $t$, the cam 87 is lifted at constant speed at where $a$ is tan A. The piston 162 then, and therefore the piston 62, move rightwardly at the speed $f(at)$ and the drive cam 158 leftwardly at this speed, rightwardly whenever $f(at)$ is diminishing. The cam 158 then drives the rollers 64, 64 and so the wedge cam 167 upwardly at a speed $df(at)$ where $d$ is tan D. Now if the cam 193 be driven rightwardly simultaneously at the same speed $t$, the wedge cam 167 while being lifted in the manner just described will further lift the roller 72 and therewith the tracer point 180 at a speed $eF(bt)$, where $e$ is tan E and $b$ is tan B. Hence when cams 93 and 193 are simultaneously driven at the same rate, the tracer point 180 is moved across the tape 181 at the rate $df(at)$ plus $eF(bt)$ and will trace the graph of this sum on the uniformly moving tape.

Thus the apparatus disclosed in Fig. 11 is a complete and operative embodiment of the arrangement diagrammatically illustrated in Fig. 6. The bases 88 and 94 on the right and 188 and 194 on the left are shown, for simplicity and convenience of illustration, as mounted on the guide rails of the carriages. In practice it may be preferable to mount these aside from and independently of the rails.

It is worthy of note, in connection with Fig. 11, that if the wedge cam 193 be not driven but left stationary, the apparatus will convert the value $t$ into $df(at)$, thus making it a device for altering the vertical or horizontal scale or both of the graph of the function $f(t)$.

Since the character and value of the invention do not depend upon whether a pointer and scale such as 80 and 81 or a recording point 180 and tape 181 are used the phrase "result member" will be used in the appended claims to signify any useful means by which the motion of the stirrup 76 or its equivalent may be either observed or recorded.

It will be noted that in the arrangements disclosed in Figs. 1, 4, 5 and 7, the shift of the result member 27 or 76 due solely to the cam action of the cam 21, 321 or 58 is directly proportional to the change in the position of the cam due to change of the variable value $x$. On the other hand, in the arrangements disclosed in Figs. 2, 3, 6 and 11, the shift of the result member 27 or 76 due solely to the cam action of the cam 121, 221, 421 or 158 is not in fixed ratio to the change in the value $x$ or $t$ since the cams 121 and 221 are shaped to other than linear functions and the non-linear cams 40 and 87 are interposed respectively between the cams 42 and 421, or between the cams 93 and 158. In each case the motion corresponding to $x$ or $t$ is converted into the corresponding part of the motion of the result member by means comprising an interposed cam shaped to correspond to some single valued, continuous mathematical function. In Figs. 1, 4, 5 and 7, the function in question is linear, the cam is in effect a straight sided wedge, and the change in position of the result member due to a change in the value $x$ or $t$ is in constant ratio thereto. In Figs. 2, 3, 6 and 11 the two changes are not in constant ratio to each other, because there is an interposed cam which is formed to correspond to a non-linear function. Nevertheless, there is a one-to-one relation between these changes defined by the cam in question. The change in position of the result member is determined positively by the change in $x$ or $t$. The relation disclosed in Figs. 1, 4, 5 and 7 is a special case of the class of relations disclosed in Figs. 2, 3, 6 and 11. There being no familiar word or convenient phrase available for this state of affairs, in the following claims the word "relation" in such phrases as "a cam member movable in relation to a quantity" shall be taken to mean that variation of the quantity is reflected in a motion of the cam member such that there is a definite, predetermined functional correspondence between the two, which may be a simple, constant ratio as in Fig. 1 or may be any desired predetermined single valued, continuous function over the range of variation in question. Similarly, in the appended claims, the term "function cam" shall be taken to mean a cam means whose cam surface is formed, as illustrated in any of Figs. 1, 2, 3, 4, 5, 6, 7 and 11, to correspond to a continuous portion of the graph of any desired, predetermined mathematical function, linear, algebraic, transcendental or whatever.

What is claimed is:

1. In an apparatus for combining plural variable quantities, a first linear cam movable proportionately to one quantity to be combined, an interchangeably mounted function cam representing a second quantity and driven by the first cam, a second linear cam driven by said function cam, a support shiftable by said second cam, means for guiding the support in a predetermined path, a third linear cam movable proportionately to a third quantity to be combined, a second interchangeably mounted function cam representing a fourth quantity and driven by said third linear cam, a fourth linear cam operable by the said second function cam and mounted on the support to be shiftable therewith and to be movable thereon, and a result member operable by the shifting of said last cam.

2. A device according to claim 1 wherein said first and third linear cams comprise adjustable wedges whereby a further factor may be introduced at each of said cams.

3. A device according to claim 1 wherein all of said linear cams comprise adjustable wedges whereby additional factors may be introduced at each of said cams.

4. An apparatus according to claim 1 wherein flexible driving means are provided between the function cams and the linear cams driven thereby to permit multidimensional movement of the said driven linear cams.

WILLIAM F. DEHN.

REFERENCES CITED

The following references are of record in the file of this patent:

UNITED STATES PATENTS

| Number | Name | Date |
| --- | --- | --- |
| 580,783 | Fuller | Apr. 13, 1897 |
| 1,453,688 | Milker | May 1, 1923 |
| 1,520,514 | Snodgrass | Dec. 23, 1924 |

(Other references on following page)

UNITED STATES PATENTS

| Number | Name | Date |
|---|---|---|
| 1,751,646 | Nieman | Mar. 25, 1930 |
| 1,986,986 | Swartwout | Jan. 8, 1935 |
| 2,077,523 | Hug | Apr. 20, 1937 |
| 2,179,822 | Imm | Nov. 14, 1939 |
| 2,222,551 | Ziebolz et al. | Nov. 19, 1940 |
| 2,229,156 | Wertheimer | Jan. 21, 1941 |
| 2,319,322 | Hefel | May 18, 1943 |
| 2,319,891 | Telander | May 25, 1943 |
| 2,369,420 | Thurston et al. | Feb. 13, 1945 |

FOREIGN PATENTS

| Number | Country | Date |
|---|---|---|
| 113,136 | Great Britain | Feb. 7, 1918 |
| 140,441 | Great Britain | Apr. 28, 1921 |
| 193,452 | Great Britain | Feb. 26, 1923 |
| 291,841 | Great Britain | June 5, 1928 |
| 415,286 | Germany | June 17, 1925 |
| 499,265 | Great Britain | Jan. 20, 1939 |
| 589,389 | France | Feb. 20, 1925 |
| 630,801 | Germany | June 6, 1936 |
| 719,544 | France | Nov. 23, 1931 |